United States Patent
Yabe et al.

(10) Patent No.: US 9,871,419 B2
(45) Date of Patent: Jan. 16, 2018

(54) ROTOR OF PERMANENT-MAGNET EMBEDDED MOTOR, AND COMPRESSOR, BLOWER, AND REFRIGERATING/AIR CONDITIONING DEVICE USING THE ROTOR

(75) Inventors: Koji Yabe, Tokyo (JP); Kazuhiko Baba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 500 days.

(21) Appl. No.: 14/366,861

(22) PCT Filed: Dec. 26, 2011

(86) PCT No.: PCT/JP2011/080089
§ 371 (c)(1),
(2), (4) Date: Jun. 19, 2014

(87) PCT Pub. No.: WO2013/098921
PCT Pub. Date: Jul. 4, 2013

(65) Prior Publication Data
US 2014/0368081 A1 Dec. 18, 2014

(51) Int. Cl.
*H02K 1/27* (2006.01)
*H02K 29/03* (2006.01)

(52) U.S. Cl.
CPC .............. *H02K 1/276* (2013.01); *H02K 29/03* (2013.01); *H02K 2213/03* (2013.01)

(58) Field of Classification Search
CPC ........ H02K 1/27; H02K 1/2706; H02K 1/276; H02K 2213/03; H02K 29/03; H02K 1/2766

(Continued)

(56) References Cited

U.S. PATENT DOCUMENTS 5,144,812 A * 9/1992 Mills, Jr. .................. F24F 1/06
62/186
6,774,521 B2 8/2004 Inayama et al.
(Continued)

FOREIGN PATENT DOCUMENTS

CN          1538589 A     10/2004
CN       101043157 A      9/2007
(Continued)

OTHER PUBLICATIONS

International Search Report of the International Searching Authority dated Mar. 19, 2012 for the corresponding international application No. PCT/JP2011/080089 (and English translation).

(Continued)

*Primary Examiner* — Joshua Benitez-Rosario
*Assistant Examiner* — Alexander Moraza
(74) *Attorney, Agent, or Firm* — Posz Law Group, PLC

(57) ABSTRACT

A rotor of a permanent-magnet embedded motor includes a rotor core having magnet insertion holes along a circumferential direction and a magnet inserted into each of the holes, wherein a gap is formed at opposite ends of a hole at a time of inserting the magnet therein, an outer peripheral face of the core is formed by a first curved surface formed from a magnetic pole center to between poles, with a radial distance from a shaft center of the core being largest at the pole center on the peripheral face, and a second curved surface formed from an interpolar portion toward the pole center to intersect with the first curved surface, with the radial distance from the shaft center being smallest in the interpolar portion on the peripheral face, and wherein a length of the first curved surface is larger than a length of the second curved surface.

12 Claims, 4 Drawing Sheets

(58) Field of Classification Search
USPC ........ 310/156.53, 156.56, 216.055, 216.092, 310/216.096, 156.46
See application file for complete search history.

(56) References Cited

U.S. PATENT DOCUMENTS

| | | | |
|---|---|---|---|
| 6,812,614 B2 | 11/2004 | Yamamoto et al. | |
| 2004/0256940 A1* | 12/2004 | Tsuruta .................. | H02K 1/276 310/156.53 |
| 2007/0200447 A1 | 8/2007 | Adaniya et al. | |
| 2007/0257576 A1 | 11/2007 | Adaniya et al. | |
| 2009/0140590 A1* | 6/2009 | Hung .................... | H02K 29/03 310/156.32 |
| 2010/0194228 A1* | 8/2010 | Lee ........................ | H02K 29/03 310/156.53 |
| 2011/0012465 A1* | 1/2011 | Kawamura ............ | H02K 1/276 310/156.53 |
| 2011/0050022 A1* | 3/2011 | Li .......................... | H02K 1/276 310/156.46 |
| 2012/0133239 A1* | 5/2012 | Taema .................. | H02K 1/276 310/216.094 |

FOREIGN PATENT DOCUMENTS

| | | |
|---|---|---|
| CN | 101669266 A | 3/2010 |
| JP | 2002-010541 A | 1/2002 |
| JP | 2002-084693 A | 3/2002 |
| JP | 2003-284275 A | 10/2003 |
| JP | 2004-260972 A | 9/2004 |
| JP | 2004-320989 A | 11/2004 |
| JP | 2005-168183 A | 6/2005 |
| JP | 2005-184918 A | 7/2005 |
| JP | 2006-238667 A | 9/2006 |
| JP | 2007-295708 A | 11/2007 |
| JP | 2007-312591 A | 11/2007 |
| JP | 2008-099418 A | 4/2008 |

OTHER PUBLICATIONS

Office Action dated Nov. 11, 2015 issued in corresponding CN patent application No. 201180075759.0 (and partial English translation).

Office Action dated Feb. 10, 2015 issued in corresponding JP patent application No. 2013-551062 (and partial English translation).

Extended European Search Report dated Mar. 21, 2016 issued in corresponding European patent application No. 11878375.2.

* cited by examiner

ROTOR OF PERMANENT-MAGNET EMBEDDED MOTOR, AND COMPRESSOR, BLOWER, AND REFRIGERATING/AIR CONDITIONING DEVICE USING THE ROTOR

CROSS REFERENCE TO RELATED APPLICATION

This application is a U.S. national stage application of PCT/JP2011/080089 filed on Dec. 26, 2011, the contents of which are incorporated herein by reference.

TECHNICAL FIELD

The present invention relates to a rotor of a permanent-magnet embedded motor, and a compressor, a blower, and a refrigerating/air conditioning device using the rotor.

BACKGROUND

Conventionally, a technology for reducing torque ripple of a permanent-magnet embedded motor has been disclosed (for example, Patent Literature 1). The permanent-magnet embedded motor includes, for example, six divided outer peripheral faces obtained by dividing an outer peripheral face of a magnetic body with an equal angular interval along a circumferential direction corresponding to a permanent magnet, and six non-magnetic portions located between respective divided outer peripheral faces. The non-magnetic portion is configured as a concave portion in which air is present between a stator and a rotor core, between the respective divided outer peripheral faces. The divided outer peripheral face includes a first circular arc surface formed at a central portion in the circumferential direction and two second circular arc surfaces having a smaller radius of curvature than that of the first circular arc surface, which are continuous to opposite ends of the first circular arc surface.

PATENT LITERATURE

Patent Literature 1: Japanese Patent Application Laid-open No. 2007-295708

However, according to the conventional technology mentioned above, in a rotor core of the permanent-magnet embedded motor, the non-magnetic portion is configured as the concave portion in which air is present between the stator and the rotor core respectively between the six divided outer peripheral faces. Therefore, a width of the non-magnetic portion in a direction orthogonal to a radial direction of the permanent magnet, which is embedded in the rotor core in the circumferential direction, is determined depending on a depth of the concave portion. Accordingly, there is a limitation in increasing the width thereof in the direction orthogonal to the radial direction of the permanent magnet, and thus it is difficult to further increase a magnetic force.

SUMMARY

The present invention has been achieved to solve the above problems, and an object of the present invention is to provide a rotor of a permanent-magnet embedded motor that can reduce torque ripple and can further increase a magnetic force, and a compressor, a blower, and a refrigerating/air conditioning device using the rotor.

In order to solve above-mentioned problems and achieve the object of the present invention, a rotor of a permanent-magnet embedded motor according to the present invention includes a rotor core provided with a plurality of magnet insertion holes along a circumferential direction; and a permanent magnets inserted into each of the magnet insertion holes to form a magnetic pole, wherein an air gap is formed at opposite ends of the magnet insertion hole in the circumferential direction at a time of inserting the permanent magnet therein, an outer peripheral face of the rotor core is formed by a magnetic pole center to between poles, with a radial distance from a shaft center of the rotor core being largest at the magnetic pole center on the outer peripheral face, and a second curved surface formed from an interpolar portion toward the magnetic pole center to intersect with the first curved surface, with the radial distance from the shaft center of the rotor core being smallest in the interpolar portion on the outer peripheral face, and wherein a length of the first curved surface is larger than a length of the second curved surface.

The present invention can reduce torque ripple and can further increase a magnetic force of a permanent-magnet embedded motor.

DETAILED DESCRIPTION

Exemplary embodiments of a rotor of a permanent-magnet embedded motor, and a compressor, a blower, and a refrigerating/air conditioning device using the rotor according to the present invention will be explained below with reference to the accompanying drawings. The present invention is not limited to the embodiments.

Embodiment

Figure 1:
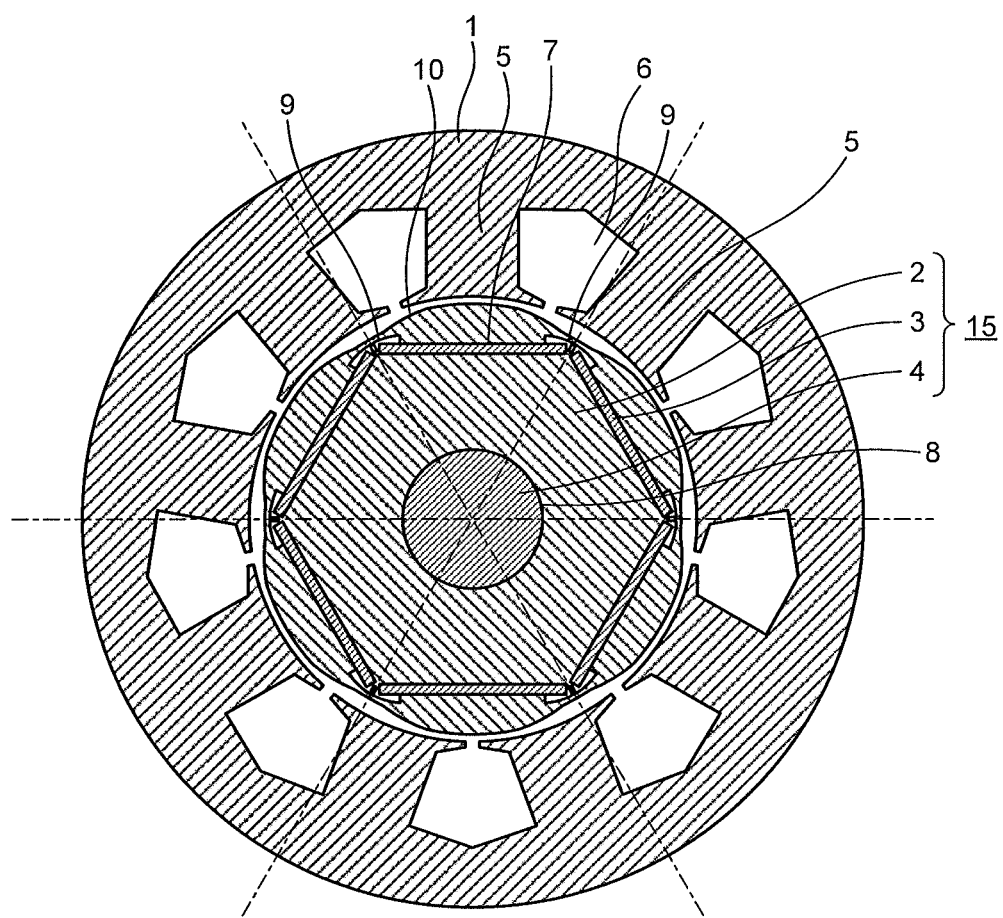
FIG. 1 is a cross-sectional view of a rotor and a stator of a permanent-magnet embedded motor according to an embodiment.

FIG. 1 is a cross-sectional view of a rotor and a stator of a permanent-magnet embedded motor according to an embodiment. As shown in FIG. 1, the permanent-magnet embedded motor includes a stator 1 and a rotor 15. The rotor 15 includes a rotor core 2, a plurality of permanent magnets 3, and a rotating shaft 4.

The stator 1 is arranged to surround the rotor 15, designating the rotating shaft 4 as a central shaft, and a plurality of teeth 5, around which stator winding is wound, are arranged along the circumferential direction in an inner periphery thereof via a slot 6 with an equal angular interval. The stator 1 may have a concentrated winding structure in which the stator winding is wound around respective teeth 5, or the stator 1 may have a distributed winding structure in which the stator winding is wound around a plurality of teeth 5. The present invention is applicable to both structures. In the example shown in FIG. 1, nine teeth 5 and nine slots 6 are provided. The number of the teeth 5 and the slots 6 is not limited thereto, and can be less than nine or can be equal to or more than nine.

The rotor core 2 is formed by punching out a thin electromagnetic steel plate (for example, a non-oriented electromagnetic steel plate having a plate thickness of 0.1 to 1.0 millimeter (a plate in which a crystal axis direction of each crystal is arranged at random as much as possible so as not to show magnetic characteristics biased to a specific direction of the steel plate)) in a predetermined shape by a mold, and laminating a predetermined number of (a plurality of) plates.

In the rotor core 2, a plurality of magnet insertion holes 7 are formed along an outer peripheral portion in the circumferential direction with an equal angular interval. The magnet insertion hole 7 is formed to generate an air gap 9 at opposite ends of the magnet insertion hole 7 in the circumferential direction, at the time of inserting the permanent magnet 3 into the magnet insertion hole 7. A shaft hole 8 into which the rotating shaft 4 is fitted is also formed at the center of the rotor core 2. As the permanent magnet 3, rare-earth metal such as neodymium, iron, and boron as main components is formed in a flat plate shape, and opposite surfaces thereof are magnetized to N pole and S pole. The permanent magnet 3 is embedded in each magnet insertion hole 7 of the rotor core 2 so that an N-pole surface and an S-pole surface are arranged alternately, thereby forming the rotor 15. The number of magnetic poles of the rotor 15 can be any number as long as it is equal to or larger than two. However, in the example shown in FIG. 1, a case where the number of magnetic poles of the rotor 15 is six is exemplified.

The outer peripheral face of the rotor core 2 is constituted by a plurality of divided outer peripheral faces 10 divided with an equal angular interval along the circumferential direction corresponding to the number of permanent magnets 3 (in this case, six magnets). Respective portions of the rotor 15 divided for each divided outer peripheral face 10 is hereinafter referred to as "magnetic pole portion".

Figure 2:
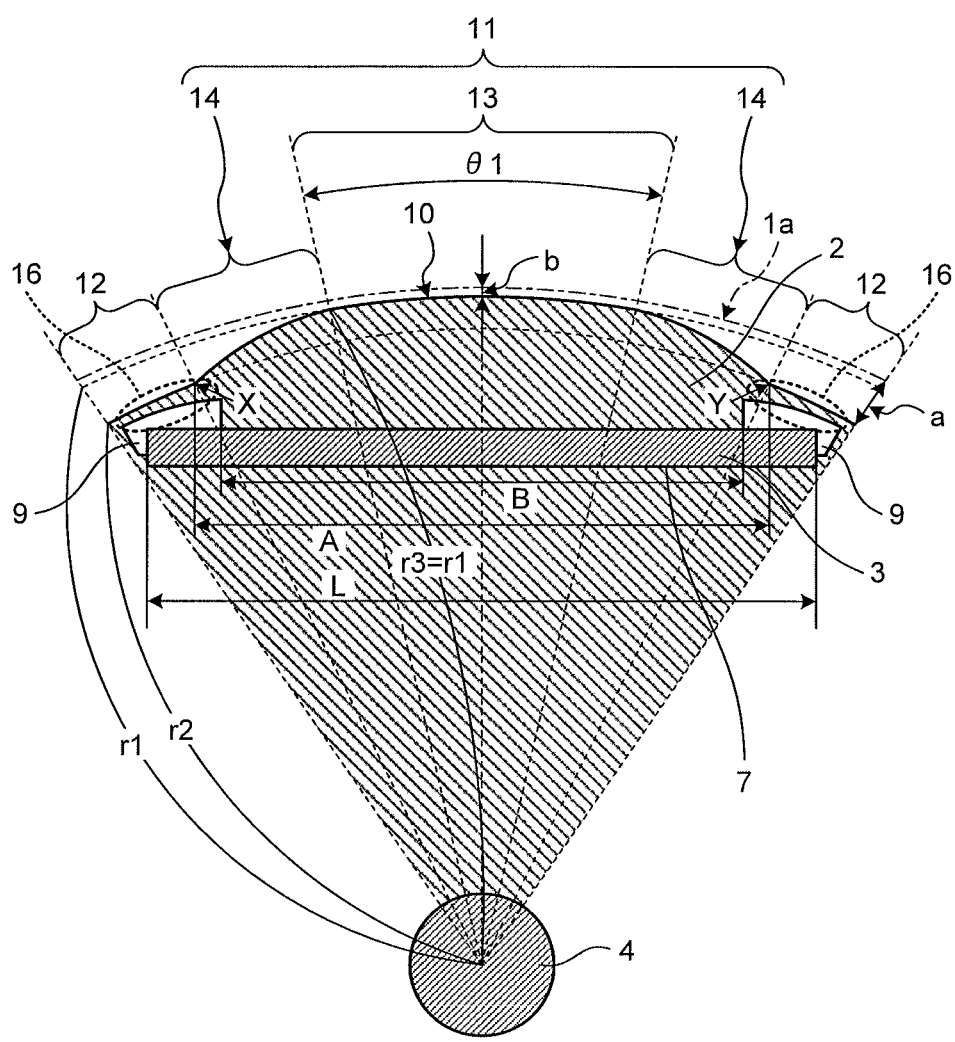
FIG. 2 is an enlarged view of a magnetic pole portion of the rotor of the permanent-magnet embedded motor shown in FIG. 1.

A structure of the magnetic pole portion of the rotor 15 of the permanent-magnet embedded motor according to the present embodiment is explained with reference to FIG. 2. FIG. 2 is an enlarged view of the magnetic pole portion of the rotor of the permanent-magnet embedded motor shown in FIG. 1.

As shown in FIG. 2, the divided outer peripheral face 10 forming the magnetic pole portion is constituted by combining a plurality of curved surfaces. More specifically, the divided outer peripheral face 10 includes a first curved surface 11 formed from a circumferential center (center of the magnetic pole) toward circumferential ends (interpolar portion), with a radial distance r1 from a shaft center of the rotor core 2 being largest at the circumferential center of the divided outer peripheral face 10, and second curved surfaces 12 respectively formed from the circumferential end toward the circumferential center to intersect with the first curved surface, with a radial distance r2 from the shaft center of the rotor core 2 being smallest at the circumferential end of the divided outer peripheral face 10. The first curved surface 11 includes a third curved surface 13 formed by a circular arc surface having a radius r3 and a fourth curved surfaces 14 in a section from the end of the third curved surface 13 until intersecting with the second curved surface 12, in a predetermined section formed from the circumferential center toward the circumferential end of the divided outer peripheral face 10. FIG. 2 is an example in which the radius r3 of the third curved surface 13 and the radial distance r1 from the shaft center of the rotor core 2 are the same (r3=r1), designating a central shaft of the circular arc surface constituting the third curved surface 13 as the shaft center of the rotor core 2.

The second curved surface 12 is formed by a circular arc surface having the radius r2 that is smaller than the radial distance r1 from the shaft center of the rotor core 2 (r1>r2). FIG. 2 is an example in which the central shaft of the circular arc surface constituting the second curved surface 12 is designated as the shaft center of the rotor core 2. As shown in FIG. 2, by having such a configuration, a radial distance "a" between the circular arc surface constituting the second curved surface 12 and an inner peripheral face 1a of the stator 1 is formed to be larger than a radial distance "b" between the circular arc surface constituting the third curved surface 13 and the inner peripheral face 1a of the stator 1.

As shown in FIG. 2, in the magnet insertion hole 7, the air gap 9 is respectively formed at the opposite ends of the magnet insertion hole 7 in the circumferential direction, at the time of inserting the permanent magnet 3 into the magnet insertion hole 7. Because the air gap 9 acts as a magnetic resistance, magnetic flux in the vicinity of a thin-wall portion 16 decreases. Accordingly, the air gap 9 also has a function of reducing leakage of the magnetic flux between the adjacent magnetic pole portions.

Figure 3:
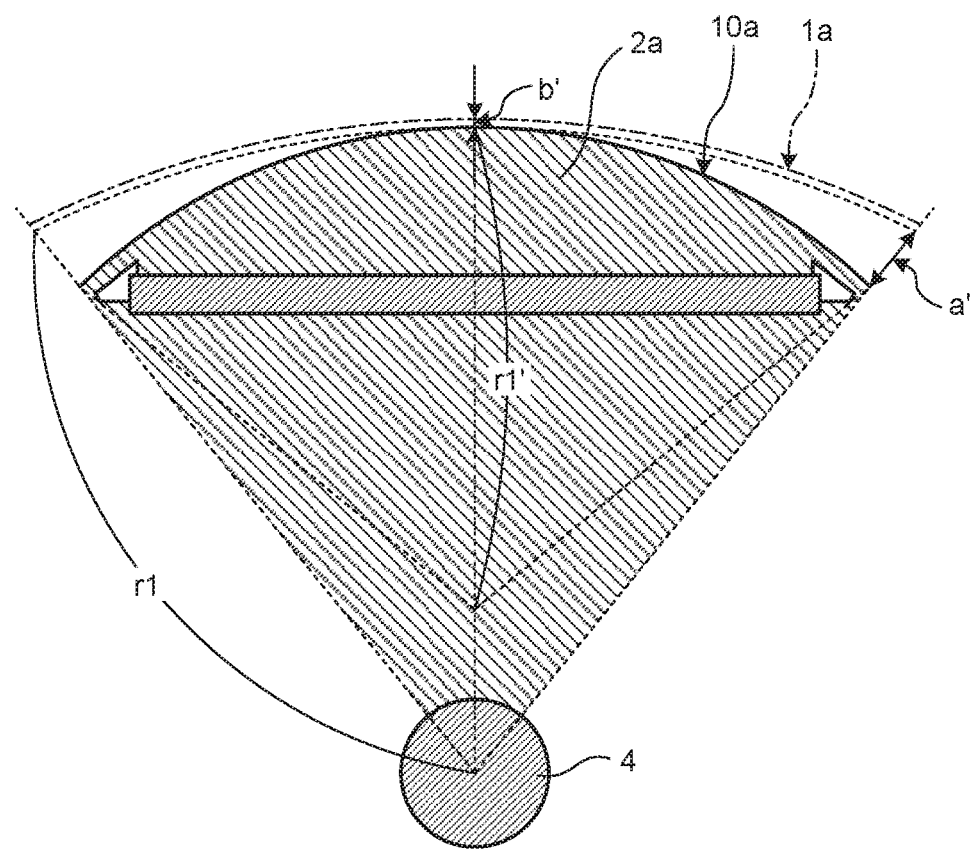
FIG. 3 is an enlarged view of a magnetic pole portion of a rotor of a conventional permanent-magnet embedded motor.

To reduce torque ripple due to harmonic components of an induced voltage and suppress generation of noise due to the torque ripple, it is desired that a magnetic flux density is largest at the circumferential center of the divided outer peripheral face 10, and the magnetic flux density has a sinusoidal waveform such that an amount of change in the magnetic flux density gradually increases from the circumferential center toward the circumferential ends on the divided outer peripheral face 10 and the magnetic flux density becomes a value near 0 T at the circumferential ends. FIG. 3 is an enlarged view of a magnetic pole portion of a rotor of the conventional permanent-magnet embedded motor. As shown in FIG. 3, in the conventional permanent-magnet embedded motor, a divided outer peripheral face 10a of a rotor core 2a is generally formed by a single circular arc surface having a radius r1', which is smaller than the radius r1 of the circular arc surface constituting the third circular arc surface 13 shown in FIG. 2. In this case, a radial distance b' between the divided outer peripheral face 10a and the inner peripheral face 1a of the stator 1 at the circumferential center becomes smallest, and a radial distance a' between the divided outer peripheral face 10a and the inner peripheral face 1a of the stator 1 at the circumferential opposite ends becomes largest. In such a case, the magnetic flux density at the circumferential center of the divided outer peripheral face 10a having the smallest radial distance increases, and the magnetic flux density decreases as the radial distance increases toward the circumferential ends of the divided outer peripheral face 10a. Accordingly, the magnetic flux density on the outer periphery of the rotor core 2a approximates to a sinusoidal waveform, thereby reducing torque ripple.

On the other hand, in the vicinity of the circumferential ends of the divided outer peripheral face 10a, because the radial distance a' between the divided outer peripheral face 10 of the rotor core 2 and the inner peripheral face 1a of the stator 1 increases, there is a limitation in increasing the width of the permanent magnet 3 in a direction orthogonal to the radial direction. Accordingly, it is difficult to further increase the magnetic force.

Therefore, in the present embodiment, as described above, the divided outer peripheral face 10 is formed by the first curved surface 11 in which the radial distance r1 from the shaft center of the rotor core 2 becomes largest and the second curved surface 12 in which the radial distance r2 from the shaft center of the rotor core 2 becomes smallest. Accordingly, a curvature at the circumferential end of the divided outer peripheral face 10 (that is, a curvature of the second curved surface 12) becomes larger than a curvature at the circumferential center of the divided outer peripheral face 10 (that is, a curvature of the first curved surface 11). The amount of change in the magnetic flux density becomes smallest in the vicinity of the circumferential center of the divided outer peripheral surface 10 and increases toward the circumferential ends of the divided outer peripheral face 10.

Furthermore, as shown in FIG. 2, a distance A between opposite ends (between X-Y) of the first curved surface 11 is set to be shorter than a width L of the permanent magnet 3 in the direction orthogonal to the radial direction, and the distance A between opposite ends of the first curved surface 11 is set to be larger than a distance B between ends of the air gaps 9 formed in the magnet insertion hole 7 on a circumferential center side of the divided outer peripheral face 10 (L>A>B). Accordingly, the magnetic flux density at the circumferential center of the divided outer peripheral face 10 increases further, and the magnetic flux density in the vicinity of the circumferential ends of the divided outer peripheral face 10 decreases further, and the magnetic flux density on the outer periphery of the rotor core 2 can be approximated to a sinusoidal waveform.

That is, according to the configuration of the present embodiment, as in the example shown in FIG. 3, the magnetic force can be further increased, while reducing torque ripple.

The configuration described above can be applied even when the permanent magnet 3 is arranged in a V shape, or the permanent magnet 3 in a circular arc shape, a tegular shape, or the like is used other than a flat plate (rectangular or trapezoidal) shape as shown in FIGS. 1 and 2. In any case, a linear distance between the opposite ends of the permanent magnet 3 closest to the circumferential ends of the divided outer peripheral face 10 only needs to be set to "L" described above.

Further, in the rotor core 2a of the conventional permanent-magnet embedded motor shown in FIG. 3, as approaching from the circumferential center toward the circumferential ends of the divided outer peripheral face 10, the radial distance b' between the divided outer peripheral face 10a of the rotor core 2a and the inner peripheral face 1a of the stator 1 increases up to the radial distance a'. Therefore, the magnetic flux density can be approximated to a sinusoidal waveform, whereas an equivalent gap increases to decrease the magnetic flux density in the vicinity of the circumferential center of the divided outer peripheral face 10.

As described above, in the present embodiment, by setting the radius r3 of the circular arc surface constituting the third curved surface 13 and the radial distance r1 from the shaft center of the rotor core 2 at the circumferential center on the first curved surface 11 to be the same (r3=r1), the radial distance "b" between the third curved surface 13 and the inner peripheral face 1a of the stator 1 can be maintained constant. Accordingly, the equivalent gap decreases, and the magnetic flux density in the vicinity of the circumferential center of the divided outer peripheral face 10 increases, thereby enabling to increase the magnetic force of the permanent-magnet embedded motor and improve the efficiency.

The fourth curved surface 14 constituting the first curved surface 11 is present to continuously connect between the third curved surface 13 and the second curved surface 12. When the fourth curved surface 14 approaches a straight line, torque ripple increases. Therefore, it is desired to form the fourth curved surface 14 by a circular arc surface. It is also desired that the third curved surface 13 and the second curved surface 12 are connected continuously as much as possible. Accordingly, in the present embodiment, the radius of the circular arc surface constituting the fourth curved surface 14 is set to be smaller than that of the circular arc surface constituting the second curved surface 12 and the circular arc surface constituting the third curved surface 13. By having such a configuration, the magnetic flux density generated from the rotor core 2 approximates to a sinusoidal waveform, thereby reducing torque ripple. As described above, the radius r3 (=r1) of the circular arc surface constituting the third curved surface 13 is larger than the radius r2 of the circular arc surface constituting the second curved surface 12. Therefore, when the radius of the circular arc surface constituting the fourth curved surface 14 is set to be smaller than the radius r2 of the circular arc surface constituting the second curved surface 12, the condition mentioned above is satisfied.

Furthermore, when the radius of the circular arc surface constituting the fourth curved surface 14 is set to be equal to or smaller than half the radial distance r1 from the shaft center of the rotor core 2 at the circumferential center on the first curved surface 11, the radius of curvature of the fourth curved surface 14 becomes larger than the radius of curvature of the third curved surface 13 in the vicinity of the circumferential center of the divided outer peripheral face 10. Accordingly, the magnetic flux density can be approximated to a sinusoidal waveform, thereby reducing torque ripple and further suppressing generation of noise due to the torque ripple.

Figure 4:
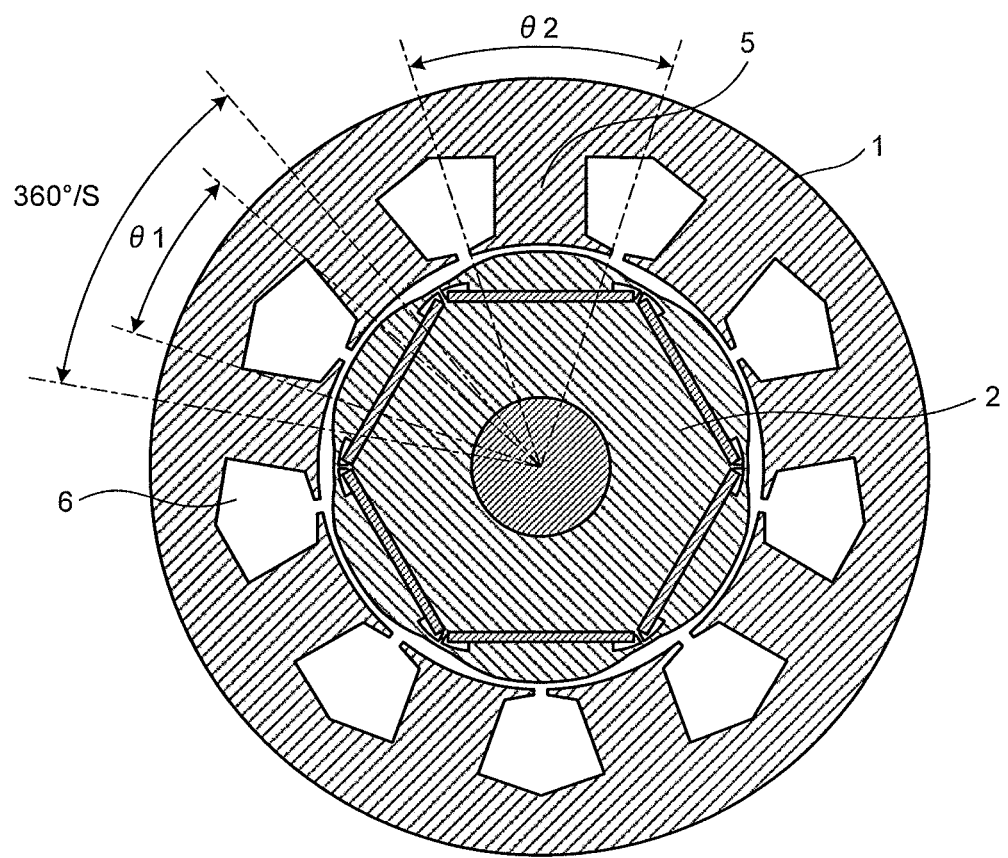
FIG. 4 is an explanatory diagram of a condition of an angle between opposite ends of a circular arc surface constituting a third curved surface.

FIG. 4 is an explanatory diagram of the condition of an angle between the opposite ends of the circular arc surface constituting the third curved surface. When the width of the circular arc surface constituting the third curved surface 13 on the divided outer peripheral face 10, that is, a predetermined section in which the radial distance between the stator 1 and the rotor core 2 is maintained constant in the vicinity of the circumferential center of the divided outer peripheral face 10 increases, a section in which even when the rotor core 2 rotates, the magnetic flux flowing into the teeth 5 formed in the stator 1 does not change may be generated. In this case, an induced voltage is hardly generated, and the induced voltage contains lots of harmonics, thereby increasing torque ripple.

Therefore, when an angle θ1 between the opposite ends of the circular arc surface constituting the third curved surface 13 (see FIG. 2) satisfies (θ1<360°/S), where S denotes the number of slots formed in the stator 1, as shown in FIG. 4, a section in which the radial distance between the rotor core 2 and the stator 1 does not change with respect to the teeth 5 of the stator 1 is not present, thereby reducing the harmonics contained in the induced voltage and reducing torque ripple.

The magnetic flux flowing into the teeth 5 depends on an angle θ2 between front edges of the teeth 5 on the inner peripheral face 1a of the stator 1. Therefore, it is more desirable to satisfy (θ1<θ2) (see FIG. 4).

Furthermore, in FIG. 2, an example in which the central shaft of the circular arc surface constituting the second curved surface 12 is designated as a shaft center of the rotor core 2 is shown. As described above, to reduce the torque ripple due to the harmonic components in the induced voltage and suppress generation of noise due to the torque ripple, it is desired that the magnetic flux density on the outer periphery of the rotor core 2 has a sinusoidal waveform, and it is also desired to decrease the amount of change in the magnetic flux density in the vicinity of the circumferential center of the divided outer peripheral face 10 and increase the amount of change in the magnetic flux density as approaching toward the circumferential ends of the divided outer peripheral face 10. Therefore, when the radial distance "a" between the circular arc surface constituting the second curved surface 12 and the inner peripheral face 1*a* of the stator 1 is set to increase from a position having a predetermined angle from the circumferential ends of the divided outer peripheral face 10 toward the circumferential ends, the magnetic flux density flowing into the teeth 5 formed in the stator 1 can be increased. Accordingly, the magnetic flux density on the outer periphery of the rotor core 2 further approximates to a sinusoidal waveform, thereby reducing torque ripple.

When it is assumed that the number of slots formed in the stator 1 is S, the predetermined angle from the circumferential end of the divided outer peripheral face 10 on the second curved surface 12 only needs to be at least (360°/S/4), and the radial distance "a" between the circular arc surface constituting the second curved surface 12 and the inner peripheral face 1*a* of the stator 1 only have to increase as approaching from a position where the angle from the circumferential end of the divided outer peripheral face 10 is at least (360°/S/4) toward the circumferential end.

Further, by forming a section from the circumferential end of the divided outer peripheral face 10 up to the position having the predetermined angle as described above on the second curved surface 12 in a convex shape in a centrifugal direction, the magnetic flux density on the outer periphery of the rotor core 2 can be further approximated to a sinusoidal waveform.

The respective curved surfaces constituting the divided outer peripheral face 10 of the rotor core 2 (that is, the third curved surface 13 and the fourth curved surface 14 constituting the first curved surface 11, and the second curved surfaces 12) can be formed in a concave shape in the centrifugal direction. However, in this case, the amount of change in the magnetic flux density on the outer periphery of the rotor core 2 increases at the circumferential center of the divided outer peripheral face 10 and decreases at the circumferential ends of the divided outer peripheral face 10. That is, when the respective curved surfaces constituting the outer peripheral face of the rotor core 2 are formed in a concave shape in the centrifugal direction, the magnetic flux density on the outer periphery of the rotor core 2 cannot be approximated to a sinusoidal waveform, which is not preferable.

Particularly, when the number of slots formed in the stator 1 is assumed to be S, the section to the position where the angle from the circumferential end of the divided outer peripheral face 10 becomes at least (360°/S/4) on the second curved surface 12 is a section in which the magnetic flux density increases from 0 T. Therefore, it is essential that the magnetic flux density in this section has a sinusoidal waveform. Accordingly, by forming the section to the position where the angle from the circumferential end of the divided outer peripheral face 10 becomes at least (360°/S/4) on the second curved surface 12 in a convex shape in the centrifugal direction, the magnetic flux density on the outer periphery of the rotor core 2 can be approximated to a sinusoidal waveform.

Furthermore, because the respective curved surfaces constituting the divided outer peripheral face 10 of the rotor core 2 have a convex shape in the centrifugal direction, the magnetic flux density on the outer periphery of the rotor core 2 can be further approximated to a sinusoidal waveform.

As described above, in the magnet insertion hole 7, the air gap 9 is formed at the circumferential opposite ends of the magnet insertion hole 7 at the time of inserting the permanent magnet 3 into the magnet insertion hole 7.

The thin-wall portion 16 generated between the outer peripheral face of the rotor core 2 and the air gap 9 has weaker strength than other portions of the rotor core 2. Therefore, it is necessary to prevent the permanent magnet 3 from coming into contact with the thin-wall portion 16 when the permanent magnet 3 moves in the magnet insertion hole 7. The air gap 9 also has a function of preventing the permanent magnet 3 from coming into contact with the thin-wall portion 16, even when the permanent magnet 3 moves in the magnet insertion hole 7.

By decreasing the radial width of the thin-wall portion 16 as approaching from the circumferential center toward the circumferential end of the divided outer peripheral face 10, the harmonic components in the induced voltage can be reduced, thereby reducing torque ripple and suppressing generation of noise due to the torque ripple.

As the radial width of the thin-wall portion 16 decreases, the magnetic flux density passing through the thin-wall portion 16 decreases. Therefore, by decreasing the radial width of the thin-wall portion 16 as approaching from the circumferential center side toward the circumferential end of the divided outer peripheral face 10, the magnetic flux density on the outer periphery of the rotor core 2 can be further approximated to a sinusoidal waveform, thereby reducing torque ripple due to the harmonic components in the induced voltage and suppressing generation of noise due to the torque ripple.

As explained above, according to the rotor of the permanent-magnet embedded motor of the present embodiment, the air gap is formed at the circumferential opposite ends of the magnet insertion hole at the time of inserting the permanent magnet into the magnet insertion hole. The outer peripheral face of the rotor core is formed by a plurality of divided outer peripheral faces divided in the circumferential direction with an equal angular interval corresponding to the permanent magnet. The divided outer peripheral face is formed by the first curved surface formed from the circumferential center toward the circumferential opposite ends, with the radial distance from the shaft center of the rotor core being largest at the circumferential center of the divided outer peripheral face, and the second curved surfaces formed from the circumferential ends toward the circumferential center to intersect with the first curved surface, with the radial distance from the shaft center of the rotor core being smallest at the circumferential opposite ends of the divided outer peripheral face. The distance between the opposite ends of the first curved surface is set to be smaller than the width of the permanent magnet in the direction orthogonal to the radial direction, and larger than the distance between the ends on the circumferential center side of the divided outer peripheral face of the air gaps formed in the magnet insertion hole. Accordingly, an arrangement interval of the permanent magnet can be enlarged in the radial direction to increase the width of the permanent magnet in the direction orthogonal to the radial direction at the circumferential center of the divided outer peripheral face, thereby further increasing the magnetic force of the permanent-magnet embedded motor, while reducing torque ripple.

Furthermore, the predetermined section formed on the first curved surface from the circumferential center toward the circumferential ends of the divided outer peripheral face, that is, the third curved surface is formed by a circular arc surface designating the shaft center of the rotor core as a central shaft, so that the radius of the circular arc surface becomes equal to the radial distance from the shaft center of the rotor core at the circumferential center of the divided outer peripheral face. Accordingly, the equivalent gap decreases, and the magnetic flux density in the vicinity of the circumferential center of the divided outer peripheral face increases, thereby further increasing the magnetic force of the permanent-magnet embedded motor and improving the efficiency.

The predetermined section of the first curved surface, that is, the section from the end of the circular arc surface constituting the third curved surface until the circular arc surface intersects with the second curved surface, that is, the fourth curved surface is formed by a circular arc surface, and the radius of the circular arc surface is set to be smaller than the radius of the circular arc surface constituting the second curved surface. Accordingly, the magnetic flux density generated from the rotor is approximated to a sinusoidal waveform, thereby reducing torque ripple.

Furthermore, when the radius of the circular arc surface constituting the fourth curved surface is set to be equal to or smaller than half the radial distance from the shaft center of the rotor core at the circumferential center on the first curved surface, the radius of curvature of the fourth curved surface becomes larger than the radius of curvature of the third curved surface in the vicinity of the circumferential center of the divided outer peripheral face. Accordingly, the magnetic flux density can be further approximated to a sinusoidal waveform, thereby reducing torque ripple and suppressing generation of noise due to the torque ripple.

By setting the angle between the opposite ends of the circular arc surface constituting the third curved surface to be smaller than (360°/number of slots), a section in which the radial distance between the rotor and the stator does not change with respect to the teeth of the stator is not present, thereby reducing the harmonics contained in the induced voltage and further reducing the torque ripple.

Because the magnetic flux flowing into the teeth 5 depends on the angle between the front edges of the teeth 5 on the inner peripheral face 1a of the stator 1, it is more preferable to set the angle between the opposite ends of the circular arc surface constituting the third curved surface to be smaller than the angle between the front edges of the teeth 5.

When the radial distance between the circular arc surface constituting the second curved surface and the inner peripheral face of the stator increases from the position having the predetermined angle from the circumferential end of the divided outer peripheral face toward the circumferential end, the magnetic flux density entering into the teeth 5 formed in the stator 1 can be increased. Accordingly, the magnetic flux density on the outer periphery of the rotor core further approximates to a sinusoidal waveform, thereby reducing torque ripple.

More preferably, when it is assumed that the number of slots formed in the stator is S, the radial distance between the stator and the rotor only needs to increase gradually from the position where the angle from the circumferential end of the divided outer peripheral face on the second curved surface becomes at least (360°/S/4) toward the circumferential end.

When the respective curved surfaces constituting the divided outer peripheral face of the rotor core (that is, the third curved surface and the fourth curved surface constituting the first curved surface, and the second curved surfaces) are formed in a concave shape in the centrifugal direction, the amount of change in the magnetic flux density on the outer periphery of the rotor increases at the circumferential center of the divided outer peripheral face and decreases at the circumferential ends of the divided outer peripheral face. That is, the magnetic flux density on the outer periphery of the rotor core cannot be approximated to a sinusoidal waveform, which is not preferable.

Particularly, when it is assumed that the number of slots formed in the stator is S, the section from the circumferential end to the position where the angle from the circumferential end of the divided outer peripheral face becomes at least (360°/S/4) on the second curved surface is a section in which the magnetic flux density increases from 0 T. Therefore, it is essential that the magnetic flux density in this section has a sinusoidal waveform. Accordingly, by forming the section to the position where the angle from the circumferential end of the divided outer peripheral face becomes at least (360°/S/4) on the second curved surface in a convex shape in the centrifugal direction, the magnetic flux density on the outer periphery of the rotor core can be approximated to a sinusoidal waveform.

Furthermore, because the respective curved surfaces constituting the divided outer peripheral face of the rotor have a convex shape in the centrifugal direction, the magnetic flux density on the outer periphery of the rotor core can be further approximated to a sinusoidal waveform.

By forming the air gap at the circumferential opposite ends of the magnet insertion hole at the time of inserting the permanent magnet into the magnet insertion hole, the leakage magnetic flux between the adjacent magnetic pole portions can be reduced, and it can be prevented that the permanent magnet moves in the magnet insertion hole to abut against the thin-wall portion generated between the outer peripheral face of the rotor core and the air gap.

Furthermore, by decreasing the radial width of the thin-wall portion as approaching from the circumferential center side toward the circumferential end of the divided outer peripheral face, the amount of change in the magnetic flux density on the outer periphery of the rotor core can be further approximated to a sinusoidal waveform, thereby reducing torque ripple due to the harmonic components in the induced voltage and suppressing generation of noise due to the torque ripple.

The permanent-magnet embedded motor according to the present embodiment is suitable for use in a compressor or a blower, and downsizing and high efficiency of the compressor and the blower can be realized.

Furthermore, by using a compressor or a blower having the permanent-magnet embedded motor according to the present embodiment applied thereto in a refrigerating/air conditioning device, downsizing and high efficiency of the refrigerating/air conditioning device can be realized.

The configuration described in the above embodiment is only an example of the configuration of the present invention, and the configuration can be combined with other well-known techniques, and it is needless to mention that the present invention can be configured while modifying it without departing from the scope of the invention, such as omitting a part of the configuration.

The invention claimed is:

1. A rotor of a permanent-magnet embedded motor comprising:
   a rotor core provided with a plurality of magnet insertion holes along a circumferential direction; and
   a plurality of permanent magnets respectively inserted into the plurality of magnet insertion holes to respectively form a plurality of magnetic poles, wherein an air gap is formed at opposite ends of the magnet insertion hole in the circumferential direction at a time of inserting the permanent magnet therein, the rotor is configured by a plurality of magnetic pole portions that are defined by interpolar portions and respectively correspond to the plurality of permanent magnets, an outer peripheral face of the rotor core is configured by a plurality of divided outer peripheral faces corresponding to outer peripheral faces of the plurality of magnetic pole portions, respectively, each of the plurality of divided outer peripheral faces is configured by:

a first curved surface that extends from a magnetic pole center towards the interpolar portions, the magnetic pole center corresponding to a circumferential center of the divided outer peripheral faces; and second curved surfaces, each of which extends from the interpolar portion toward the magnetic pole center and is a circular arc surface having a second radius at the interpolar portion, a center of the circular arc surface being a center of a shaft center of the rotor core, and the first curved surface includes:

a third curved surface that extends from the magnetic pole center towards the interpolar portions and is a third circular arc surface having a first radius larger than the second radius, a center of the third circular arc surface being the center of the shaft center of the rotor core; and fourth curved surfaces, each of which extends from the third curved surface to a second curved surface and is a circular arc surface having a radius smaller than the second radius.

2. The rotor of a permanent-magnet embedded motor according to claim 1, wherein
the radius of each fourth curved surface is equal to or smaller than half of the first radius.

3. The rotor of a permanent-magnet embedded motor according to claim 1, wherein
an angle between opposite ends of the third curved surface is smaller than (360°/number of slots of stator).

4. The rotor of a permanent-magnet embedded motor according to claim 1, wherein
an angle between opposite ends of the third curved surface is smaller than an angle between front edges of teeth of a stator.

5. The rotor of a permanent-magnet embedded motor according to claim 1, wherein
a radial distance between the circular arc surface constituting each second curved surface and an inner peripheral face of a stator increases as approaching toward the interpolar portion.

6. The rotor of a permanent-magnet embedded motor according to claim 5, wherein
each second curved surface has a predetermined angle from the interpolar portion on the outer peripheral face which is at least (360°/number of slots of stator/4).

7. The rotor of a permanent-magnet embedded motor according to claim 1, wherein
each second curved surface has a predetermined angle from the interpolar portion on the outer peripheral face which is at least (360°/number of slots of stator/4).

8. The rotor of a permanent-magnet embedded motor according to claim 5, wherein
a radial width of a thin-wall portion formed between the outer peripheral face of the rotor core and the air gap decreases as approaching from the magnetic pole center side toward the interpolar portion side on the outer peripheral face.

9. A compressor having the rotor of a permanent-magnet embedded motor according to claim 1 applied thereto.

10. A blower having the rotor of a permanent-magnet embedded motor according to claim 1 applied thereto.

11. A refrigerating/air conditioning device having the compressor according to claim 9 incorporated therein.

12. A refrigerating/air conditioning device having the blower according to claim 10 incorporated therein.

* * * * *